Feb. 28, 1967   P. HANSEN   3,305,943
SAILING SIMULATOR
Filed Jan. 8, 1965   3 Sheets-Sheet 1

INVENTOR.
PETER HANSEN
BY
Kleinberg & Lilling
ATTORNEYS

Feb. 28, 1967  P. HANSEN  3,305,943
SAILING SIMULATOR
Filed Jan. 8, 1965  3 Sheets-Sheet 3

INVENTOR.
PETER HANSEN
BY
Kleinberg & Lilling
ATTORNEYS

United States Patent Office 3,305,943
Patented Feb. 28, 1967

3,305,943
SAILING SIMULATOR
Peter Hansen, 2436 Stuart St., Brooklyn, N.Y. 11229
Filed Jan. 8, 1965, Ser. No. 424,267
5 Claims. (Cl. 35—11)

This invention is concerned with a method and device for simulating and thereby enabling the teaching of the sailing of boats; more particularly it describes a model sailing boat that can be utilized for amusement and instructional purposes; and especially describes a model sailboat that may be remotely controlled and manipulated to teach the art of sailing.

It is well known that the art of sailing boats is both complicated and involved. When sailing a vessel, one must be cognizant of the rules of sailing and be able to effect the proper movements of the vessel by instinct.

Heretofore the development of the necessary know-how for proper and safe operation of a sailing vessel could be acquired only by actual experience. The acquiring of such experience is not only time consuming and expensive, but may, at times, be dangerous.

It is a cardinal object of this invention, therefore, to provide a device including a model sailing vessel which will accurately reproduce the action of a boat sailing in the water, and, thus instruct an operator as to the proper method of sailing.

Another primary object hereof is to provide a sailing simulator that will jibe, reach, run, sail by the lee, be caught aback, and any other tack on the various directional points of sailing.

Still another prime objective of this invention is the provision of a sailing simulator that will at all times indicate the proper heel to port or starboard, and, the proper position of the sails and their behaviour.

Still another object of this invention is the provision of a sailing simulator that will rotate through 360 degrees and that can automatically indicate when to set a spinnaker and when to take it off, when to close haul, when to set a headsail, and when to jibe and indicate also any running light requirements.

Yet another object of this invention is the provision of a device as above set forth wherein the direction of the true wind relative to the boat can be shifted as desired.

Yet another function of this invention is the provision of a sailing simulator that will be functional and efficient.

With these objects in view, the invention consists of the novel features of construction and arrangement of parts which will appear in the following specification and recited in the appended claims, reference being had to the accompanying drawings, in which the same reference numerals indicate the same parts throughout the various figures, and in which:

Figure 1:
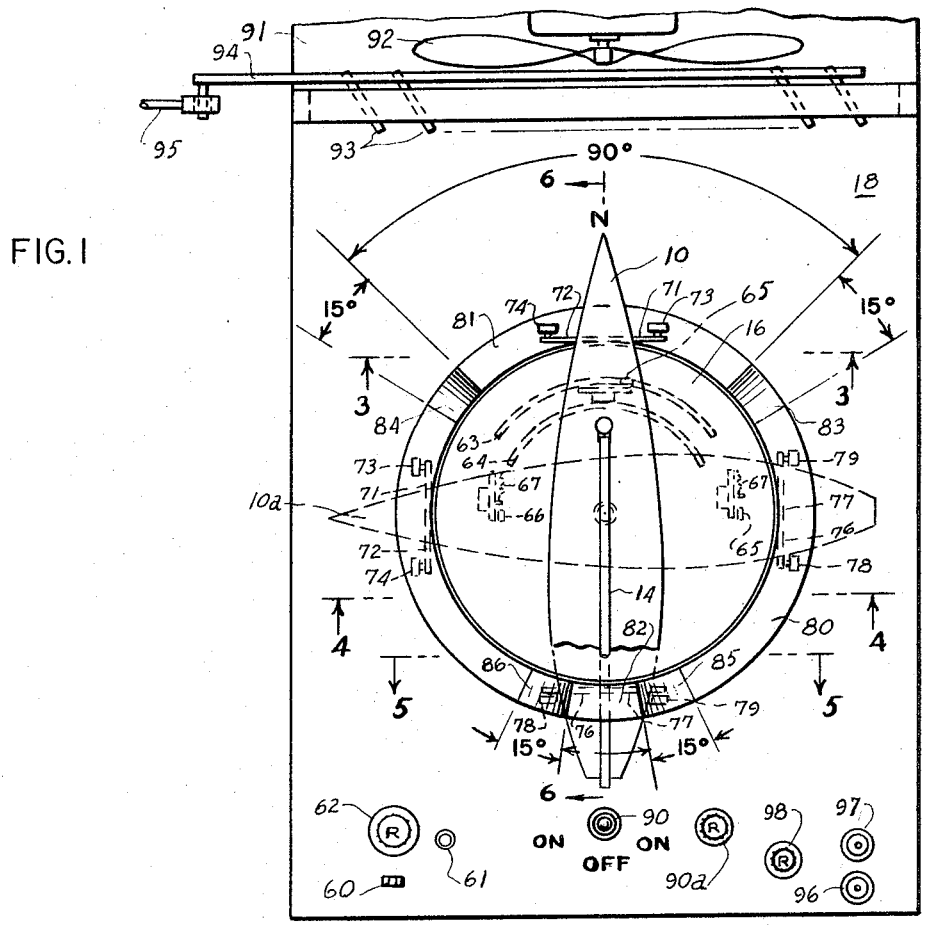
FIG. 1 is a plan view of one embodiment of the invention with the portions illustrated diagrammatically.
Figure 2:
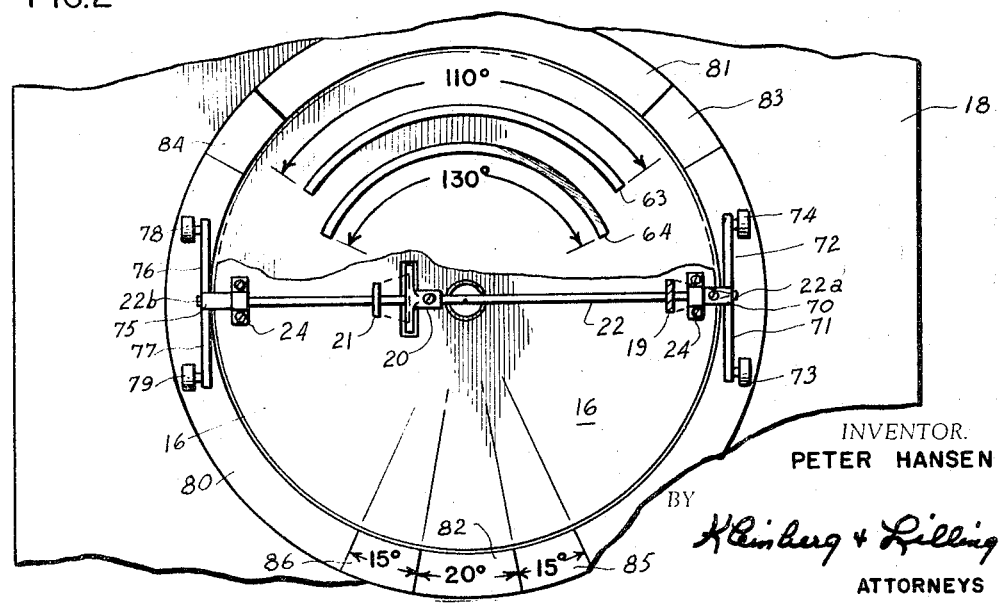
FIG. 2 is a plan view of a portion of the support platform with the boat removed, showing the boat support shaft and contact rings.
Figure 3:
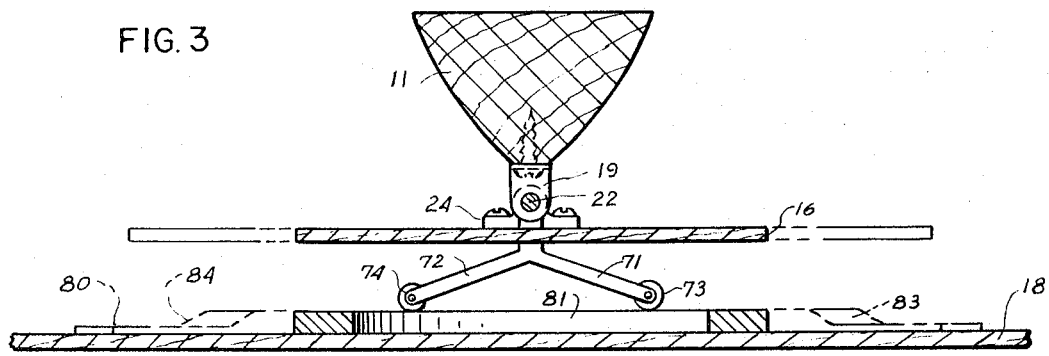
FIG. 3 is an enlarged fractional and sectional view taken substantially along line 3—3 of FIG. 1 showing the forward section of the boat hull and its bracket support.
Figure 4:
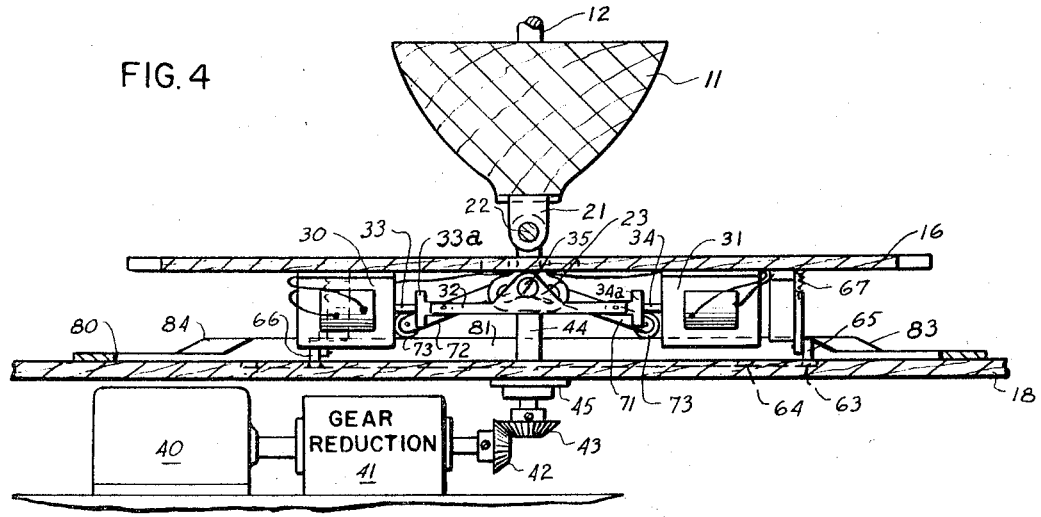
FIG. 4 is an enlarged and sectional elevational view taken substantially along line 4—4 of FIG. 1 showing the mid-section of the boat hull and its supporting bracket and heel actuating mechanism.
Figure 5:
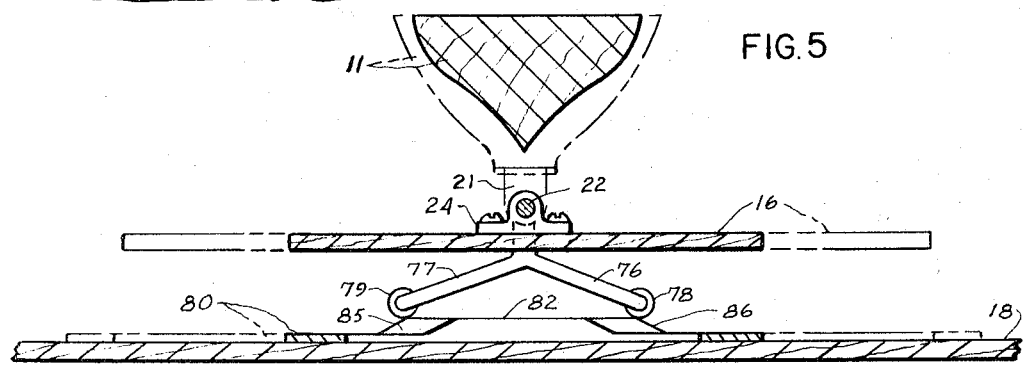
FIG. 5 is an enlarged and sectional elevational view taken substantially along line 5—5 of FIG. 1 showing the aft portion of the boat hull and its supporting bracket.
Figure 6:
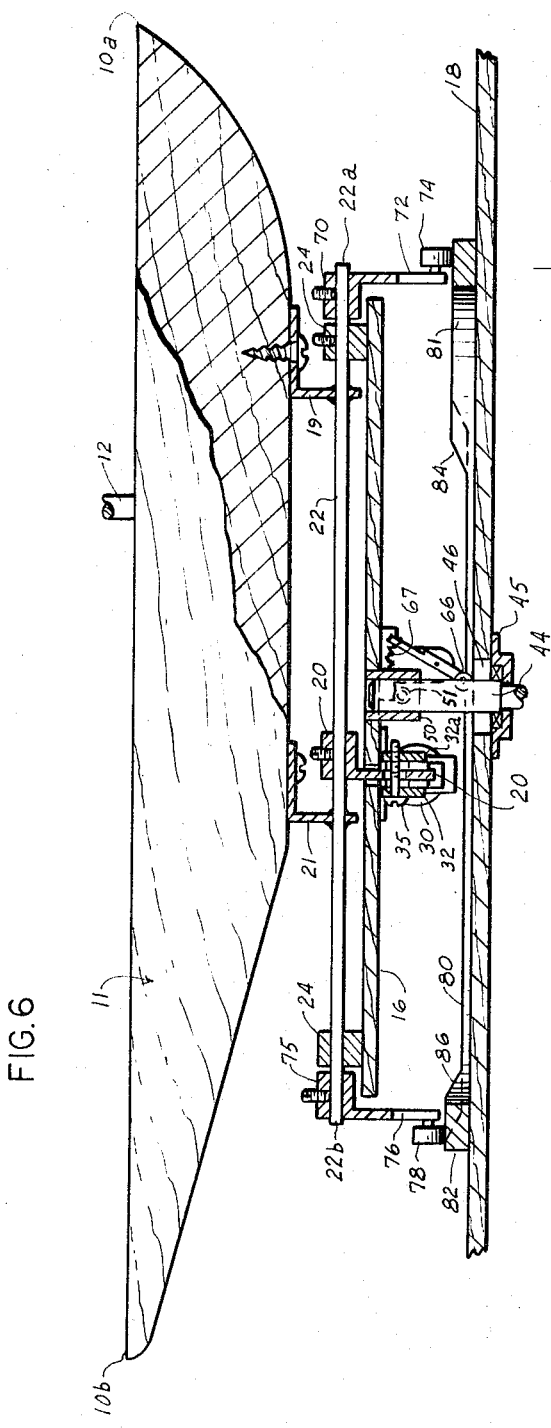
FIG. 6 is an enlarged and sectional view taken substantially along line 6—6 of FIG. 1 showing the boat hull and its support assembly.

Referring to the drawings wherein there is shown an exemplary embodiment of the invention, there is set forth the hull of a model sailing boat 11 to which a mast 12, a boom 14 and sails (not shown) may be affixed. The parts will be fabricated to approximate scale for a realistic effect and may be constructed of any suitable material.

The sailing boat 10 will be mounted on a movable table 16 secured over an opening within a stationary table 18.

A control mechanism is supplied to actuate the table 16 and the model sailing boat 10, to be responsive to certain predetermined conditions.

The hull 11 of the boat 10 is supported on a forward bracket 19 and an after-section bracket 21. The said brackets 19 and 21 will be secured to the underside of the hull 11 as by screws or the like. Each of the brackets 19 and 21 will be supported on and rigidly connected to a shaft 22. The said shaft 22 will be disposed longitudinally under the center of the model sailing boat 10 extending from the bow 10a to the stern 10b. The shaft 22 will be retained in position on the table 16 by bearing and retainer assemblies 24. Thus, the boat 10 is rigidly connected, along its longitudinal axis, to the table 16, but its vertical axis may nevertheless be rotated about said longitudinal axis.

A bracket 20 is rigidly affixed to the shaft 22. A slot 23 is provided in the lower portion of the bracket 20. The movement of this bracket 20 will cause a rotation of the shaft 22 and will place the boat in a heeling position. Such movement of the bracket 20 is accomplished by means of two electro-magnetic solenoids 30 and 31 mounted in a fixed position to the underside of the table 16. The solenoid 30 is located beneath the port side of the hull 11 and the solenoid 31 is located beneath its starboard side. T-shaped members 33a and 34a are affixed respectively to the ends of the shafts 33 and 34 of the solenoids 30 and 31. Plates 32 and 32a are affixed to the said T-shaped members 33a and 34a so as to provide a rigid connection between the shafts 33 and 34. Further, the said plates 32 and 32a are so affixed as to provide a longitudinal slot therebetween; through which the lower portion of the bracket 20 passes. Circular openings are provided at the mid-points of the plates 32 and 32a, which openings are in alignment with the slot 23 in the bracket 20. A pin 35 passes through the said openings and the slot 23 and is there retained. Said pin 35 thus provides a pivotal connection between the bracket 20 and the plates 32 and 32a.

Figure 7:
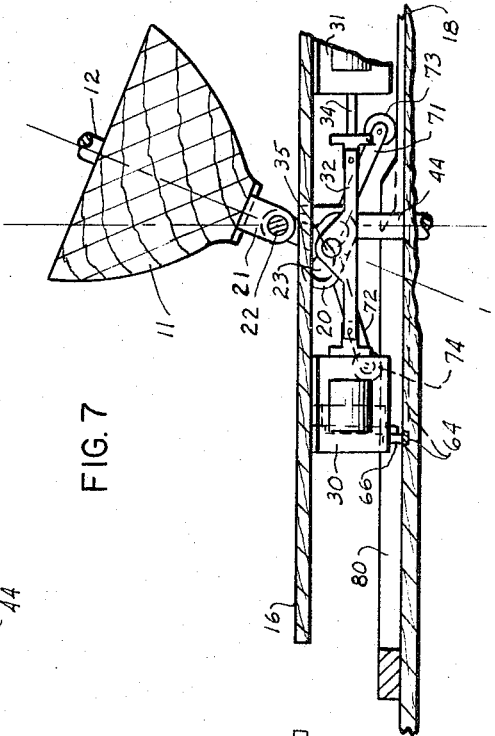
FIG. 7 is an enlarged and sectional elevational view showing the mid-section of the boat hull and its supporting bracket and heel actuating mechanism when in a tacking position. It is an alternate position to FIG. 4.

Thus, an excitation of the solenoid 30 will cause its shaft 33 to withdraw within its core and thereby carry the shaft composed of plates 32 and 32a and the pin 35 to the port side. Such movement will cause a corresponding movement of the bracket 20 and an attendant rotation of the shaft 22 so as to cause the boat 10 to heel to the starboard side, as illustrated in FIG. 7. Conversely, an excitation of the solenoid 31 will cause the boat 10 to heel to the port side.

Figure 8:
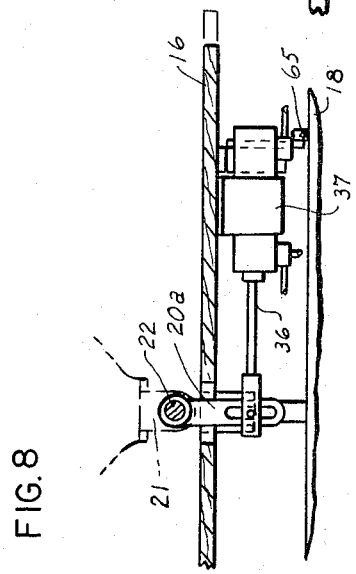
FIG. 8 is an alternate to FIG. 4 showing another embodiment of a heel actuating mechanism.

An alternate mechanism to cause the heeling of the boat 10 is illustrated in FIG. 8 where the bracket 20a is similarly pivotally connected to the end of a shaft 36 of an actuating cylinder 37. Said cylinder 37 may be pneumatic or hydraulic and it will be of a type where the shaft 36 may both, withdraw or extend from its neutral position. The cylinder, 37 is mounted in a fixed position to the underside of the table 16. Thus, withdrawal or extension of the shaft 36 of the cylinder 37 causes the movement of the bracket 20a and an attendant rotation of the shaft 22 resulting in the boat being caused to heel either to the port or the starboard side.

The table 16 is caused to rotate clockwise or counterclockwise, at the discretion of the operator, by an electric motor 40 and gear reduction means 41 transmitting power by means of a pair of bevelled gears 42 and 43 to the shaft 44. Alternatively, a series of belts and pulleys may be used in lieu of the aforesaid reduction gear 41 and gears 42 and 43. The motor 40 and gear reducer 41 are located on the underside of the table 18.

The shaft 44 passes through a circular opening 46 in the approximate center of the fixed table 18 and is therein retained and axially supported by a bearing and retainer assembly 45.

A collar 50 is rigidly affixed at the center of the table 16 and to the underside thereof. The collar 50 passes over the top portion of the shaft 44. The shaft 44 is rigidly retained within said collar 50 by a set screw 51. Thus, the table 16 is rigidly connected to the shaft 44, and thus may the table 16 and the boat 10 be rotated.

The solenoids 30 and 31 are electrically actuated. A main electrical switch 60 will control the power to the unit. A pilot light 61 will indicate the supply of current to the unit. A variable resistor 62 operating through a pair of arcuate contact rings 63 and 64, supplies, and regulates the power to the actuating solenoids 30 and 31.

Electrical power to actuate the solenoids 30 and 31 is transmitted from the rings 63 and 64 by a pair of roller contactors 65 and 66 connected to the said solenoids 30 and 31 and mounted, adjacent thereto, to the underside of the table 16.

The arcuate contact rings 63 and 64 are set into the top surface of the table 18. The contactors 65 and 66 are pivotally mounted and are urged into contact with the top surface of table 18 by springs 67. Thus, as the table 16 rotates, the contactors 65 and 66 will come into and out of contact with the arcuate contact rings 63 and 64, thus, energizing and de-energizing the solenoids 30 and 31.

The contactor 65 for actuating the solenoid 31 is located beneath the starboard side of the hull 11 and so positioned as to be able to make contact only with the outer ring 63.

The contactor 66, for actuating the solenoid 30, is located beneath the port side of the hull 11 and so positioned as to be able to make contact only with the inner ring 64.

When the bow of the boat 10 is facing south, or north, as shown in FIG. 1, neither contactor 65 nor 66 is in contact. As the table 16 rotates, from north, counter-clockwise, the bow of the boat 10 will point westwardly (as shown in phantom in FIG. 1). Assuming the wind to be always from the north, a boat heading in such a direction is said to be on a starboard tack, that is the wind is from the starboard. Under such conditions the boat 10 will heel to the port side. As hereinbefore explained, this condition is simulated by energizing the starboard solenoid 31. It is thus accomplished. As the table 16 rotates counterclockwise, as aforesaid, the starboard contactor 65 will, at the proper point, make contact with the outer ring 63, thus completing the electrical circuit necessary for the energizing of the solenoid 31.

Similarly, if the boat is caused to head toward the east, on a port tack, the boat 10 will be caused to heel to the starboard side by the energizing of the port solenoid 30. This is accomplished by the port contactor 66 making contact with the inner ring 64.

The operation is the same whether the bow 10a of the boat 10 is turning from the south toward the north, or from the north toward the south.

The same contactors 65 and 66 and arcuate contact rings 63 and 64 may be used, in the alternate embodiment of this invention, to actuate the before mentioned three-position cylinder 37.

In the preferred embodiment of this invention, the solenoids 30 and 31 are single acting. They remain energized so long as its contactor is in contact with a ring. When contact between the contactor 65 and ring 63, or, between contactor 66 and ring 64, is broken, the solenoids 31 and 30 respectively, are de-energized. The boat 10 must then return to an upright position. This is accomplished by mechanical means as follows.

The bow portion 22a of the shaft 22 will have fastened thereon a collar 70 with extending arms 71 and 72 retaining freely rotatable rollers 73 and 74 at their external ends. Similarly the stern portion 22b of the shaft 22 will have a collar 75 with extending arms 76 and 77 and retaining oppositely disposed freely rotatable rollers 78 and 79.

Fastened to the top side of the table 18 is a cam ring 80. Said cam ring 80 is located directly beneath the rollers 73 and 74, and, 78 and 79, and, the said cam's circular shape provides a pathway for all the said rollers over the entire rotation of the table 16.

A high 81 is provided at the upwind end of the cam 80 and another high 82 at the downwind end. The cam 80 has inclines 83 and 84 leading to the high 81, and, inclines 85 and 86 leading to the high 82, thus providing a smooth path from the lows to the highs of the cam 80.

In one embodiment of this invention the high 81 extends ninety degrees and the high 82 twenty degrees, while each of the inclines 83, 84, 85 and 86 extend fifteen degrees. The arcuate contact rings 63 and 64 are each segments of inner concentric circles to the cam ring 80, and, in the same embodiment, the rings 63 and 64 are 110 degrees and 130 degrees respectively. The centers of the highs 81 and 82 and the rings 63 and 64 are in straight alignment.

In other embodiments of this invention, the arcuate length of the arcs 63 and 64 will vary depending upon the positioning of the rollers 65 and 66 and the diameter of the circles of which the arcs 63 and 64 are a segment.

The length and position of the arc 63 and the position of the roller 65 are coordinated so that the roller 65 is in contact with the arc 63 only after the port side rollers 74 and 78 have passed over the highs 81 and 82. Analogously, the length and position of the arc 64 and the position of the roller 66 are coordinated so that the roller 66 is in contact with the arc 64 only after the starboard side rollers 73 and 79 have passed over the highs 81 and 82.

Thus, does this invention accomplish the simulation of hull action. The wind will be from a generally north direction. When the bow of the boat is facing into the wind, the sails will luff and the hull will be substantially erect. This condition remains, depending on wind velocity and boat design, for headings up to forty-five degrees on either side of wind direction. Beyond this point the boat will heel. The sail setting will vary depending on how many degrees from wind direction the bow points. However, the boat will remain in a heeling attitude until the wind is approximately behind the boat. When this occurs, the boat will assume an erect position.

Illustrating; the boat in the sailing simulator herein described will remain erect when the bow faces north (as shown in FIG. 1), which for these purposes is the wind direction. The sails will luff. As the boat is caused to rotate, for example, clockwise, the sails will start to fill out. At approximately forty-eight degrees east of north the starboard rollers 73 and 74 will have passed from the respective highs 81 and 82. Also the roller 66 will contact the arc 64 thus causing the energization of the solenoid 30 and a resultant heel to the starboard side, as aforesaid. The boat 10 will remain in this starboard heeling position until, at a heading of about 150 degrees east of north the roller 66 comes out of contact with the arc 64, thus causing the de-energizing of the solenoid 30 and a releasing of the force holding the boat 10 in the said heeling position. At about this same point the roller 73 will contact the incline 85 and the roller 78 will contact the incline 84. Thus, as the clockwise rotation continues the shaft 22 will be caused to rotate by means of the movement of the collars 70 and 75 induced by the cam highs 81 and 82. The shaft 22 will be thus caused to rotate until the rollers 74 and 79 are also upon the highs 81 and 82, at which point the boat will re-assume an upright position. In analogous fashion, the boat will assume a heel to the port side and re-assume an upright position as its rotation is continued clockwise toward north, or its starting position. Also, there is an analogous opposite action if the boat is rotated counter-clockwise.

Rotation, clockwise or counter-clockwise, of the table 16 is controlled by a double pole-double throw-spring return switch 90. This will serve as a tiller for remotely controlling the heading of the boat 10. When released, the switch will return to its neutral position, thereby avoiding any inadvertent movements. The speed of rotation is regulated by means of a control rheostat 90a.

Mounted to one side of the boat 10 is a vertical support 91 containing one or more air blowers therein. The said blowers 92 will, when actuated, cause a flow of air in approximately the direction of the said boat 10. The angle of the direction of the air in relation to the position of the boat 10 may be controlled by a plurality of louvers interposed therebetween. The louvers 93 are affixed to a common control arm 94 which may be manually actuated or remotely electrically operated by means of a louver drive arm 95. Thus, movement of the louver control arm 94 will cause corresponding movement of the said louvers 93, thereby altering the angle of the wind direction in relation to the boat 10. Of course, the velocity of the wind is controllable merely by altering the speed of the blowers 92 or the angle of attack of the blower blades.

Set into the stationary table 18 are switch 96 to turn the blowers 92 "on" or "off," and, switch 97 to control the direction of rotation of said blowers. The speed of rotation is regulated by means of the control rheostat 98.

In one embodiment of the invention already constructed, the louvers may move from 20 degrees left of center to 20 degrees right of center, thereby providing up to a forty degree shift in wind direction, as desired.

By combination of the above movements, the model sailing boat 10 can be made to tack, to starboard, or port; to jibe, and to run. As any of these movements are effected, the boat will automatically show the proper heel to port or starboard. Also, as these movements are effected, the boom, which will be allowed to move, will be actuated by the wind acting upon the sails. Thus, the novice will learn the proper positioning of sails and recognize the various positions that a sailboat may assume. By rotating the model through a full 360 degrees the operator will be advised, merely by observing the unit, when to set a spinnaker (the balloon-shaped sail) for a "run," when to take it off and set the sails for a "reach," when to "jibe" or "come about." The true wind can be shifted to the right or left by the louvers 72, as previously explained, in order to present an even greater variety of sailing conditions.

To further assist in the understanding of sailing techniques a graduated color code may be provided to indicate the points of sailing such as "close haul," "full and by," "close reach," "broad reach," "beam reach," "spinnaker run"; and, also the running light characteristics when under power and sail or sail alone.

Thus, by the method and apparatus provided above, an operator many manipulate the controls, and thereby observe the proper operation of a sailing vessel. The direction of the true wind, tacking position and the angle of heel, etc., may all be controlled and the resulting conditions observed. The device of this invention is for both instructive and amusement purposes. It may be utilized as a game of skill to test, competitively, the proper operation of a sailing boat.

If desired, more complicated arrangements of sailing boats may be provided for additional illustrative purposes.

Furthermore, additional refinements may be provided if desired. For example, as aforesaid, a single hydraulic cylinder may be provided to actuate the heel of the boat, etc.

While there are above disclosed but a limited number of embodiments of the structure and product of the invention herein presented, it is possible to produce still other embodiments without departing from the inventive concept herein disclosed, and it is desired, therefore, that only such limitations be imposed on the appended claims as are stated therein or required by the prior art.

Having thus described my invention and illustrated its use, what I claim as new and desire to secure by Letters Patent is:

1. A device for instructing in the art of sailing a boat, comprising, in combination, a model boat, brackets secured to the underside of the said boat at the forward and after section thereof, a rotatable shaft fixedly secured to both of said brackets and extending longitudinally of the underside of said model boat, whereby said boat will be rotated by the rotation of said shaft and about the axis thereof, said shaft rotatably secured to a rotary table, said table being supported by and affixed to the uppermost portion of a second shaft extending vertically thereto, and motor means to rotate said second shaft whereby the rotation of said second shaft will cause the rotation of said rotary table and the rotation of said boat about the vertical axis of the latter; the ends of said first shaft extending beyond the outer edges of said rotary table, cam follower means attached at both ends of said first shaft so as to be engageable with a cam ring affixed to the upper surface of a non-moveable table, said non-moveable table being positioned below the underside of said rotary table and said cam ring having highs and lows whereby the boat will be caused to rotate about its longitudinal axis upon rotation of said boat about its vertical axis.

2. A device for instructing in the art of sailing a boat in accordance with claim 1 further including a pair of arcuate contact rings positioned on the uppermost surface of said non-moveable table interiorly and concentric with said cam ring, electro-mechanical means affixed to the underside of said rotary table for rotation therewith, whereby contact between said electro-mechanical means and said arcuate contact means will cause a movement of the said boat about its longitudinal axis thus to simulate a change in tack of said boat.

3. A device for instructing in the art of sailing a boat, according to claim 2, said electro-mechanical means including a pair of oppositely disposed electro-magnetic solenoids, a transverse member affixed to and interconnecting the reaction members of said electro-magnetic solenoids, a bracket engageable with said transverse member and affixed to said first longitudinally extending shaft whereby the actuation of the said solenoids will cause the rotation of said shaft.

4. A device for instructing in the art of sailing a boat, according to claim 2, said electro-mechanical means being an electrically actuated cylinder, the reaction member of said cylinder being connected to a bracket affixed to said first shaft whereby the actuation of said cylinder will effect rotation of said shaft.

5. A device for instructing in the art of sailing a boat, according to claim 2, in combination with an electrical control circuit for controlling the direction of rotation of said rotary table, and blower means whereby air may be blown from a determinable direction relative said boat.

References Cited by the Examiner

UNITED STATES PATENTS

| | | | |
|---|---|---|---|
| 2,208,083 | 7/1940 | Rousseau | 35—11 |
| 2,721,740 | 10/1955 | Skelley | 272—44 |
| 2,855,702 | 10/1958 | Taylor | 35—11 |
| 2,938,279 | 5/1960 | Hemstreet et al. | 35—12 |
| 3,012,337 | 12/1961 | Spencer et al. | 35—12 |

EUGENE R. CAPOZIO, *Primary Examiner.*

S. M. BENDER, *Assistant Examiner.*